(12) United States Patent
Zhang et al.

(10) Patent No.: US 8,180,394 B2
(45) Date of Patent: May 15, 2012

(54) WIRELESS TERMINAL HAVING AN EXTENDING LAYER BODY

(75) Inventors: Bin Zhang, Shenzhen (CN); Xiaohui Zhao, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 489 days.

(21) Appl. No.: 12/437,876

(22) Filed: May 8, 2009

(65) Prior Publication Data

US 2009/0221336 A1    Sep. 3, 2009

Related U.S. Application Data

(63) Continuation of application No. PCT/CN2008/071654, filed on Jul. 16, 2008.

(30) Foreign Application Priority Data

Aug. 14, 2007   (CN) .......................... 2007 2 0122377

(51) Int. Cl.
*H04M 1/00* (2006.01)
(52) U.S. Cl. .................................. 455/556.1; 455/575.1

(58) Field of Classification Search ............... 455/550.1, 455/556.1, 556.2, 575.1; 379/433.01, 433.05, 379/433.06, 433.07, 433.13
See application file for complete search history.

(56) References Cited

U.S. PATENT DOCUMENTS

| 8,041,405 B2 * | 10/2011 | Urushihara et al. | 455/575.1 |
| 2007/0123322 A1 * | 5/2007 | Mizushina | 455/575.1 |

FOREIGN PATENT DOCUMENTS

| CN | 1588959 A | 3/2005 |
| CN | 1610355 A | 4/2005 |
| CN | 1655562 A | 8/2005 |
| CN | 201122999 Y | 9/2008 |
| WO | WO 2006/129768 | * 12/2006 |

* cited by examiner

*Primary Examiner* — Nguyen Vo
(74) *Attorney, Agent, or Firm* — Leydig, Voit & Mayer, Ltd.

(57) ABSTRACT

A wireless terminal in a wireless communication field is provided, which not only includes a top layer body and a bottom layer body, but also includes at least one extending layer body to provide an extending function. The extending layer body is connected in a stacked way to the top layer body or the bottom layer body. The extending function of the wireless terminal is realized through the extending layer body, so that the wireless terminal has powerful capabilities of extending and combining the functions.

9 Claims, 4 Drawing Sheets

WIRELESS TERMINAL HAVING AN EXTENDING LAYER BODY

CROSS-REFERENCE TO RELATED APPLICATIONS

This application is a continuation of International Patent Application No. PCT/CN2008/071654, filed Jul. 16, 2008, which claims priority to Chinese Patent Application No. 200720122377.X, filed Aug. 14, 2007, both of which are hereby incorporated by reference in their entirety.

FIELD OF THE TECHNOLOGY

The present invention relates to the wireless communication field, and more particularly to a wireless terminal.

BACKGROUND

As the communication technology has been rapidly developed and popularized, wireless terminals and data services provided by the wireless terminals have gradually changed the daily life and work of people today, for example, the popularization of mobile phones enables the communication between people become easier.

Meanwhile, as the communication services become increasingly diversified, the functions of wireless terminals also become diversified. Taking the mobile phone for example, at first, it merely has a function of providing calling services, but now it becomes a palm computer capable of downloading applications, which can provide various services, for example, game playing, camera, media playing, net surfing, mobile office, mobile business, and so on.

Generally, the wireless terminal is constituted by a display and a host. According to the appearance, commonly used mobile phones are classified into bar phone, clamshell phone, slide phone, and twist phone. The current twist phone has an upper layer and a lower layer connected through a rotating mechanism.

However, the inventors of the present invention have found that, with the development of the technologies and the applications of 3G, the functions supported by the wireless terminal are continuously increased, so that functional modules are continuously added in the wireless terminal, and as a result, the volume of the wireless terminal becomes increasingly large. Therefore, it is rather inconvenient for the user to carry along the wireless terminal and use it, so that the user experience is degraded. Furthermore, various functions of the wireless terminal are not always applicable to each consumer, different consumers have different demands, and the current wireless terminal cannot enable the consumer to select the functional modules at random.

SUMMARY

Accordingly, the present invention is mainly directed to a wireless terminal, so that the wireless terminal has powerful capabilities of extending and combining the functions.

In order to solve the above technical problem, a wireless terminal is provided in the present invention, which includes a top layer body and a bottom layer body, and further includes at least one extending layer body, adapted to provide an extending function, in which the extending layer body is connected in a stacked way to the top layer body or the bottom layer body.

Compared with the prior art, the present invention has the following main differences and effects.

The wireless terminal not only includes a top layer body and a bottom layer body, but also includes at least one extending layer body, which is connected in a stacked way to the top layer body or the bottom layer body, and adapted to provide an extending function. The extending function of the wireless terminal may be realized through the extending layer body, so that the wireless terminal has powerful capabilities of extending and combining the functions. For example, if the user requires the wireless terminal to provide a function 1 and a function 2 that cannot be provided by the top layer body and the bottom layer body, an extending layer body providing the function 1 and an extending layer body providing the function 2 are connected between the top layer body and the bottom layer body. If the user requires the wireless terminal to provide the function 2, a function 3, and a function 4 that cannot be provided by the top layer body and the bottom layer body, the extending layer body providing the function 2, an extending layer body providing the function 3, and an extending layer body providing the function 4 are connected between the top layer body and the bottom layer body, so that a new wireless terminal with a plurality of bodies stacked together is realized, and it is convenient for the user to selectively combine the functions of the wireless terminal at random. Meanwhile, the user may also selectively purchase extending modules according to personal preference, so as to save the purchasing cost.

DETAILED DESCRIPTION

In order to make the objectives, technical solutions, and advantages of the present invention more comprehensible, further description of embodiments of the present invention is given below with reference to the accompanying drawings.

In a first embodiment of the present invention, a wireless terminal is provided, which includes a top layer body, a bottom layer body, and at least one (a plurality of) extending layer body adapted to provide an extending function. The extending layer bodies are connected in a stacked way to the top layer body or the bottom layer body. The so-called connecting in a stacked way refers that an upper layer body covers a lower layer body, for example, the bodies are connected in a stacked way together through rotating connection, slide-rail connection, engaging connection, and the like.

Figure 1:
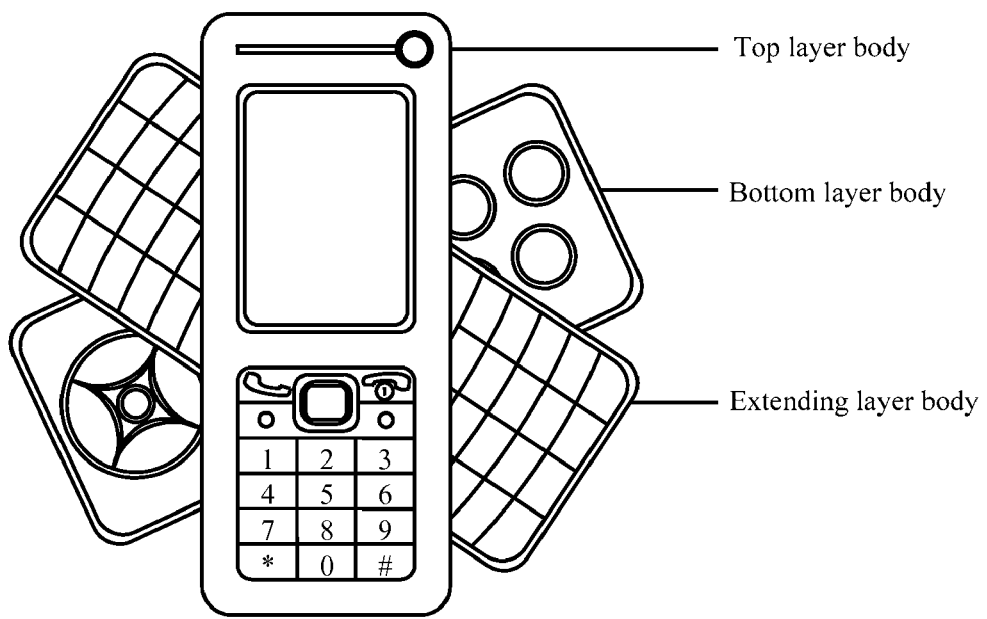
FIG. 1 is a schematic structural diagram of a wireless terminal according to a first embodiment of the present invention.

In the following, the connecting in a stacked way is realized, for example, through rotating connection. As shown in FIG. 1, the top layer body and the bottom layer body are rotationally connected to the extending layer bodies respectively, the extending layer bodies are rotationally connected to each other, and different extending layer bodies provide different extending functions.

Specifically, the top layer body and the bottom layer body provide basic functions of the wireless terminal, for example, a picture display function, a key pressing function, a camera function, a calling function, a power supply function, and an antenna function etc, so that when the user randomly selects the extending functions of the wireless terminal, he/she does not need to worry about whether the combined wireless terminal can ensure the basic functions or not, for example, calling function and short message receiving function.

A connecting mechanism 1 is respectively disposed on the top layer body, the bottom layer body, and the extending layer body. As shown in FIG. 2 to FIG. 5, the connecting mechanism 1 includes a stator 2 fixed on the body, a rotor 3 capable of rotating with respect to the stator 2, and a connector 4 fixed on the rotor 3. The rotor 3 and the connector 4 are respectively divided into two parts: a rotor 3-1 and a rotor 3-2, and a connector 4-1 and a connector 4-2. The connector 4-1 and the connector 4-2 are connected by means of insertion (the connector 4-1 and the connector 4-2 respectively have PINs to be connected with each other), so as to realize a signal transmission function, an energy transmission function, and a physical connection between the upper layer body and the lower layer body.

Particularly, the connector 4-1 is protruded and located on the rotor 3-1 of the connecting mechanism 1 on a lower part of the upper layer body, and the connector 4-2 is depressed and located on the rotor 3-2 of the connecting mechanism 1 on the upper part of the lower layer body, so that the connector 4-1 and the connector 4-2 are connected together by means of insertion. A protruded portion of the rotor 3-1 is matched with a depressed portion of the rotor 3-2. After being connected together by means of insertion, the connector 4-1 and the connector 4-2 are rotated with respect to each other for a small angle, so that the protruded portion of the rotor 3-1 is engaged with the depressed portion of the rotor 3-2, thereby finishing the connection between the upper layer body and the lower layer body. After finishing the connecting motion, the rotator 3 on the two neighboring bodies are engaged with each other, and the rotor 3 and the stator 2 on each of the two neighboring bodies rotate with respect to each other, so that the two neighboring bodies rotate with respect to each other, so as to provide a specific embodiment for achieving a new wireless terminal with a plurality of bodies stacked together and rotating with respect to each other.

During disassembling process, it merely needs to release the engagement between the rotor 3-1 and the rotor 3-2, and then inversely rotate for a corresponding angle to separate the connector 4-1 from the connector 4-2, so as to release the connection between the connecting mechanisms 1 of the two bodies.

The wireless terminal containing only one extending layer body is taken as an example, which includes a top layer body, an extending layer body, and a bottom layer body, and the specific connections between each body are described below.

Figure 2:
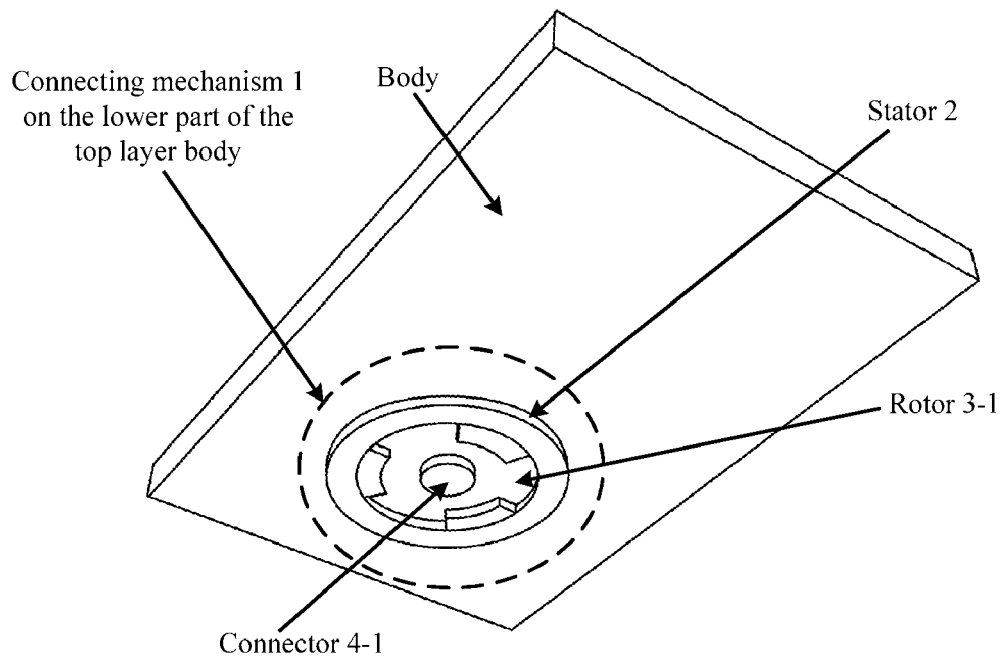
FIG. 2 is a schematic structural diagram of a lower part of a top layer body of the wireless terminal according to the first embodiment of the present invention.
Figure 3:
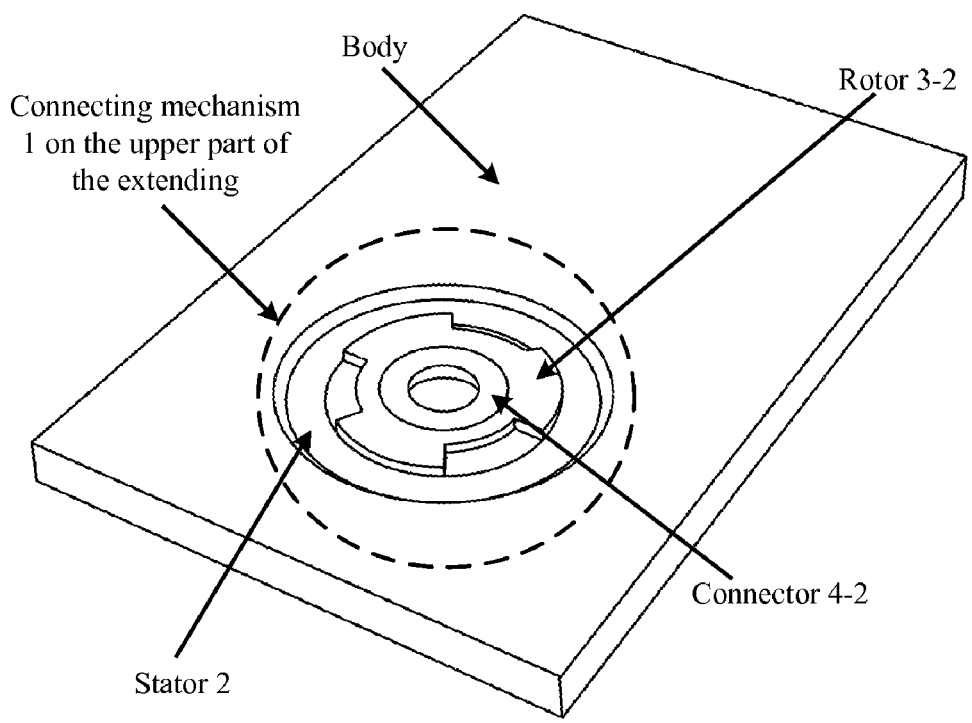
FIG. 3 is a schematic structural diagram of an upper part of an extending layer body of the wireless terminal according to the first embodiment of the present invention.
Figure 4:
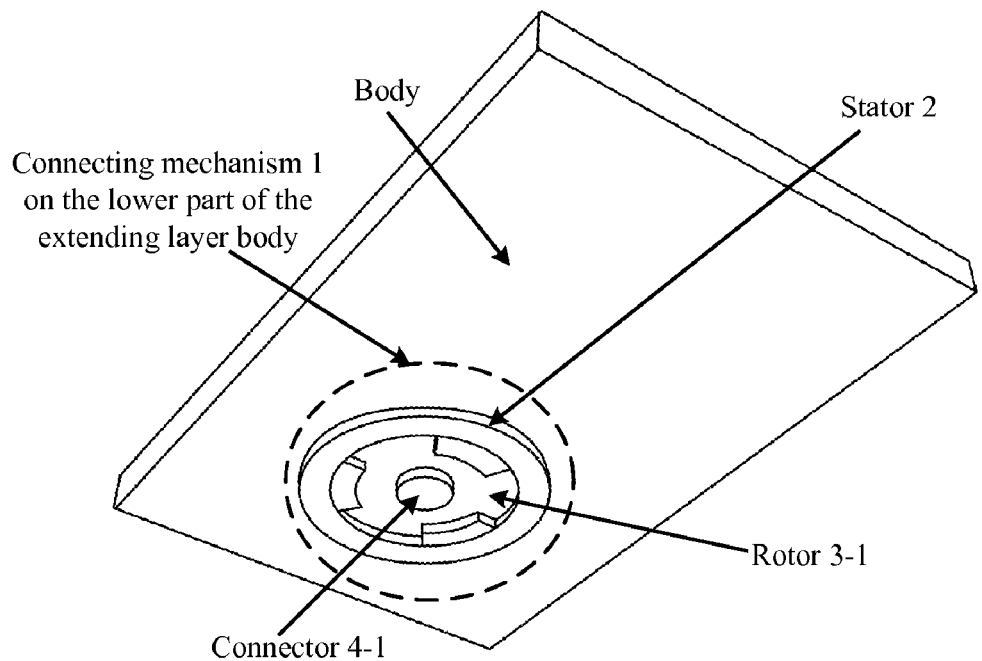
FIG. 4 is a schematic structural diagram of a lower part of the extending layer body of the wireless terminal according to the first embodiment of the present invention.
Figure 5:
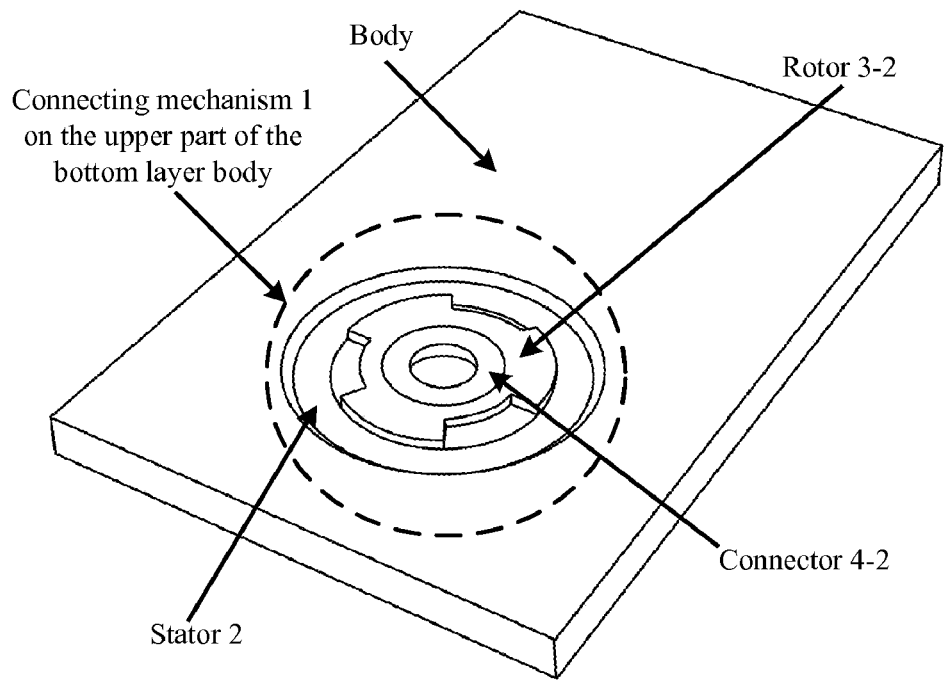
FIG. 5 is a schematic structural diagram of an upper part of a bottom layer body of the wireless terminal according to the first embodiment of the present invention.

The connecting mechanism 1 on the lower part of the top layer body as shown in FIG. 2 is connected to the connecting mechanism 1 on the upper part of the extending layer body as shown in FIG. 3. Similarly, the connecting mechanism 1 on the lower part of the extending layer body as shown in FIG. 4 is connected to the connecting mechanism 1 of the bottom layer body as shown in FIG. 5, so as to form the wireless terminal as shown in FIG. 1. If a plurality of extending layer bodies is configured, connecting mechanisms 1 on upper parts and lower parts of the other extending layer bodies are the same as that of the above extending layer body, and thus, the plurality of extending layer bodies is combined into one wireless terminal, as long as the connecting mechanisms 1 are connected in sequence. In the wireless terminal, each body can rotate. Different extending layer bodies are used to provide different extending functions. Since the extending functions of the wireless terminal are realized through the extending layer bodies, the wireless terminal has powerful capabilities of extending and combining the functions. For example, if the user requires the wireless terminal to provide a function 1 and a function 2 that cannot be provided by the top layer body and the bottom layer body, an extending layer body providing the function 1 and an extending layer body providing the function 2 are rotationally connected between the top layer body and the bottom layer body. If the user requires the wireless terminal to provide the function 2, a function 3, and a function 4 that cannot be provided by the top layer body and the bottom layer body, the extending layer body providing the function 2, an extending layer body providing the function 3, and an extending layer body providing the function 4 are rotationally connected between the top layer body and the bottom layer body, so that a new wireless terminal with a plurality of bodies being stacked together and rotating with respect to each other is realized, and it is convenient for the user to selectively combine the functions of the wireless terminal at random. The extending functions may be a game playing function, an entertainment function, or a full keyboard function, and the user may selectively purchase extending modules according to personal preference, so as to save the purchasing cost.

In a second embodiment of the present invention, a wireless terminal is provided. Similar to the first embodiment, each layer body of the wireless terminal is connected with each other through the similar connecting mechanism 1, the difference there-between lies in that, in the first embodiment, the connector 4-1 is fixed on the rotor 3-1 of the connecting mechanism 1 on the lower part of the upper layer body, and the connector 4-2 is fixed on the rotor 3-2 of the connecting mechanism 1 on the upper part of the lower layer body, while in this embodiment, the connector 4-1 is fixed on the rotor 3-2 of the connecting mechanism 1 on the upper part of the lower layer body, and the connector 4-2 is fixed on the rotor 3-1 of the connecting mechanism 1 on the lower part of the upper layer body.

Figure 6:
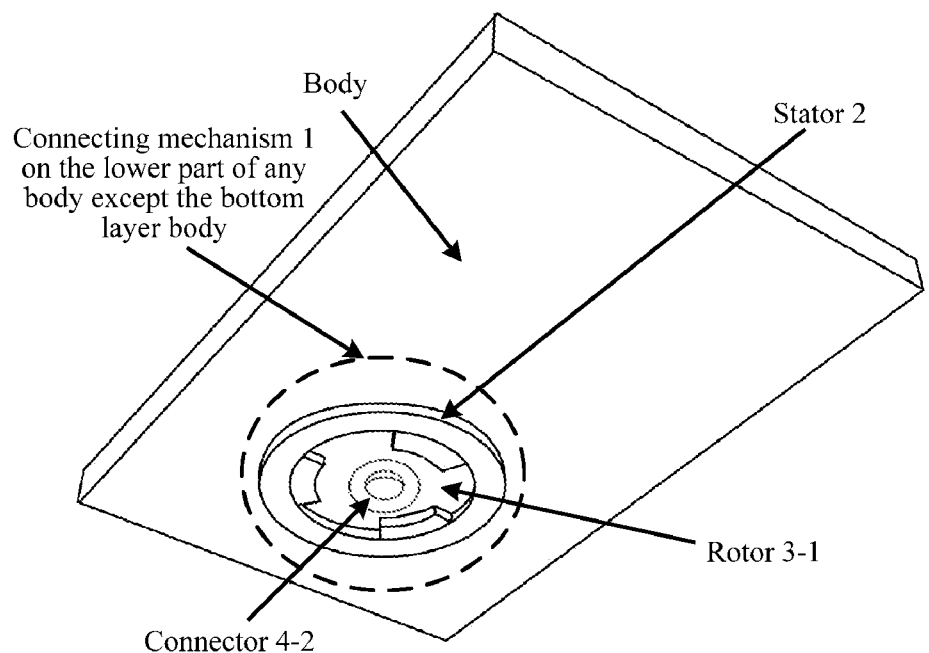
FIG. 6 is a schematic structural diagram of a lower part of any layer body of the wireless terminal except the bottom layer body according to a second embodiment of the present invention.
Figure 7:
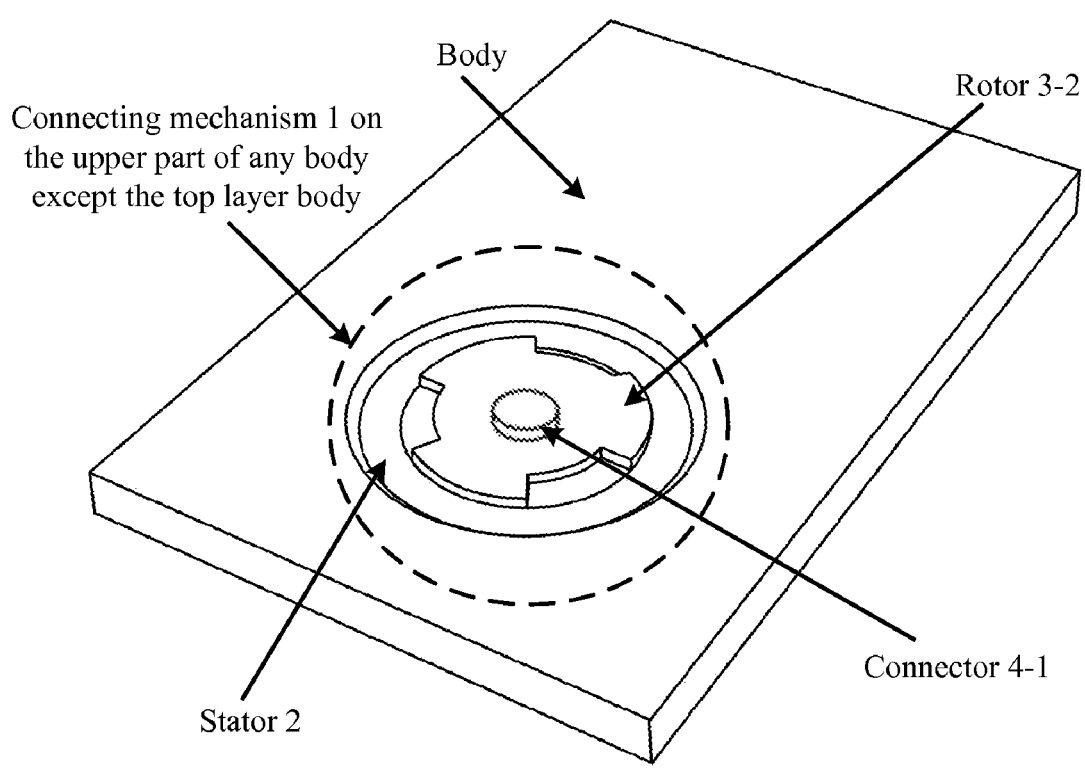
FIG. 7 is a schematic structural diagram of an upper part of any layer body except the top layer body of the wireless terminal according to the second embodiment of the present invention.

In other words, except the top layer body, the other bodies are connected by means of inserting the connector 4-1 of the connecting mechanism 1 on the upper part of each body into the connector 4-2 of the connecting mechanism 1 on the lower part of the upper layer body. The connecting mechanism 1 on the upper part of any body except the top layer body is shown in FIG. 6, and the connecting mechanism 1 on the lower part of any body except the bottom layer body is shown in FIG. 7. Similarly, the rotor 3-1 and the rotor 3-2 of the respective connecting mechanism 1 of the two neighboring layers are engaged with each other, so that the two neighboring layers rotate with respect to each other.

Thus, the top layer body and the bottom layer body are rotationally connected to the extending layer bodies respectively, and the extending layer bodies are rotationally connected to each other. Different extending layer bodies provide different extending functions. The extending functions of the wireless terminal are realized through the extending layer bodies, so that the wireless terminal has powerful capabilities of extending and combining the functions.

To sum up, in the embodiments of the present invention, the wireless terminal not only includes a top layer body and a bottom layer body, but also includes at least one extending layer body adapted to provide an extending function. The top layer body and the bottom layer body are respectively connected to the extending layer bodies, the extending layer bodies are connected to each other, and different extending layer bodies provide different extending functions. The extending functions of the wireless terminal are realized through the extending layer bodies, so that the wireless terminal has powerful capabilities of extending and combining the functions. For example, if the user requires the wireless terminal to provide the function 1 and the function 2 that cannot be provided by the top layer body and the bottom layer body, the extending layer body providing the function 1 and the extending layer body providing the function 2 are connected between the top layer body and the bottom layer body. If the user requires the wireless terminal to provide the function 2, the function 3, and the function 4 that cannot be provided by the top layer body and the bottom layer body, the extending layer body providing the function 2, the extending layer body providing the function 3, and the extending layer body providing the function 4 are connected between the top layer body and the bottom layer body, so that a new wireless terminal with a plurality of bodies stacked together is realized, and it is convenient for the user to selectively combine the functions of the wireless terminal at random. The extending function may be the game playing function, the entertainment function, or the full keyboard function, and the user may also selectively purchase the extending modules according to personal preference, so as to save the purchasing cost.

Two neighboring bodies rotate with respect to each other, so as to ensure that the user can operate the keys on the extending layer.

The top layer body and the bottom layer body provide basic functions of the wireless terminal, so that when the user selects the extending functions of the wireless terminal randomly, it does not need to worry about whether the combined wireless terminal can ensure the basic functions or not, for example, calling function, short message receiving function, as well as energy supplying function.

It will be apparent to those skilled in the art that various modifications and variations can be made to the present invention without departing from the scope or spirit of the invention. In view of the foregoing, it is intended that the present invention cover modifications and variations of this invention provided that they fall within the scope of the following claims and their equivalents.

What is claimed is:

1. A wireless terminal, comprising:
a top layer body;
a bottom layer body; and
at least one extending layer body connected in a stacked way with at least one of the top and bottom layer bodies, the at least one extending layer body providing an extending function;
wherein, each of the top layer body, the bottom layer body and the at least one extending layer body has a connecting mechanism comprising a stator and a rotor capable of rotating with respect to the stator.

2. The wireless terminal according to claim 1, wherein:
a connecting mechanism on a lower part of an upper layer body is connected with a connecting mechanism on an upper part of a lower layer body in an inserting manner through a first connector and a second connector.

3. The wireless terminal according to claim 2, wherein:
the rotor of the connecting mechanism on the lower part of the upper layer body is engaged with the rotor of the connecting mechanism on the upper part of the lower layer body; and
the upper layer body and the lower layer body rotate with respect to each other by rotating the rotors and the stators of the connecting mechanisms on the upper layer body and the lower layer body.

4. The wireless terminal according to claim 3, wherein,
the first connector is fixed on the rotor of the connecting mechanism on the lower part of the upper layer body; and
the second connector is fixed on the rotor of the connecting mechanism on the upper part of the lower layer body.

5. The wireless terminal according to claim 3, wherein
the first connector is fixed on the rotor of the connecting mechanism on the upper part of the lower layer body; and
the second connector is fixed on the rotor of the connecting mechanism on the lower part of the upper layer body.

6. The wireless terminal according to claim 2, wherein the first connector is protruded, the second connector is depressed, and the first connector and the second connector are connected by means of insertion, so as to realize a signal transmission function, an energy transmission function, and a physical connection between the upper layer body and the lower layer body.

7. The wireless terminal according to claim 1, wherein the top layer body and the bottom layer body provide basic functions of the wireless terminal.

8. The wireless terminal according to claim 7, wherein the basic functions comprise at least one of a picture display function, a key pressing function, a camera function, a calling function, a power supply function and an antenna function.

9. The wireless terminal according to claim 1, wherein the extending function provided by the extending layer body comprises at least one of a game playing function, an entertainment function, and a full keyboard function.

* * * * *